K. SCHULTE.
PLOW ATTACHMENT.
APPLICATION FILED APR. 25, 1912.
1,074,898.
Patented Oct. 7, 1913.
2 SHEETS—SHEET 1.
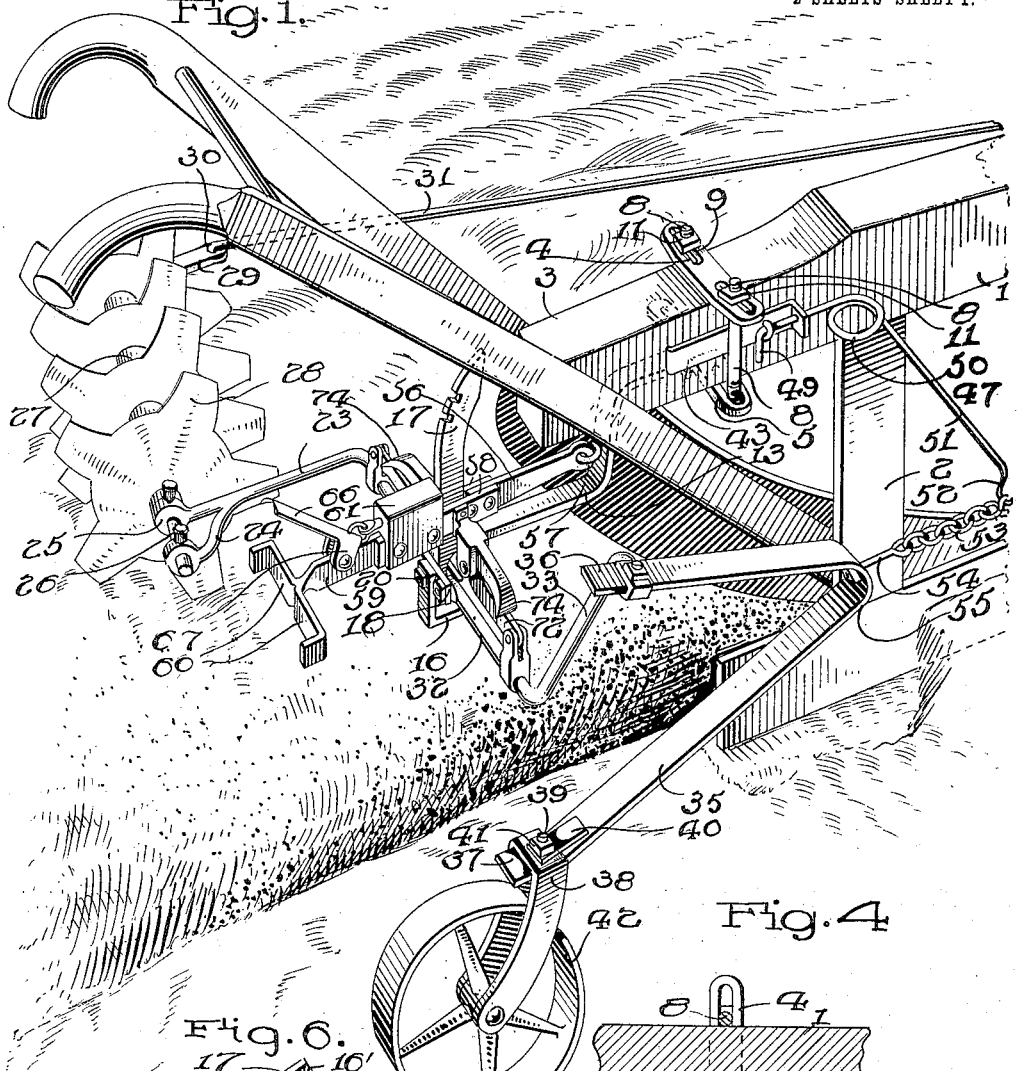
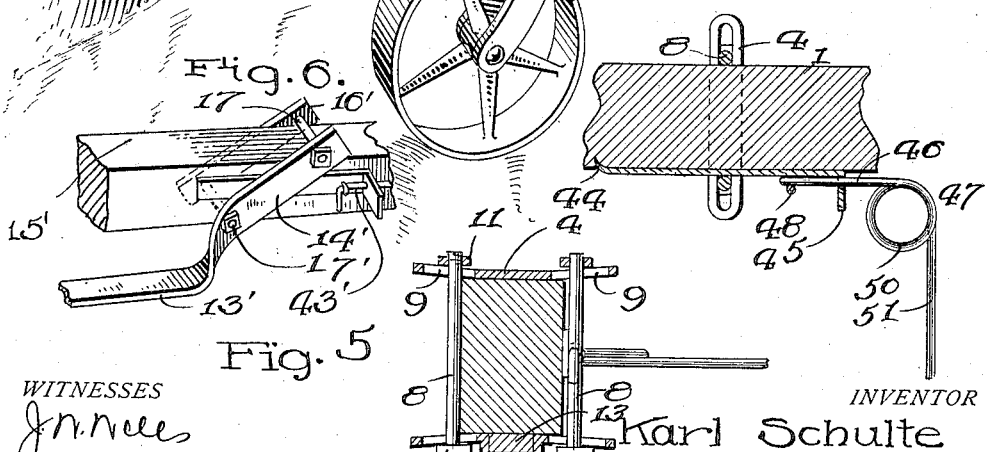
WITNESSES
INVENTOR
Karl Schulte K. SCHULTE.
PLOW ATTACHMENT.
APPLICATION FILED APR. 25, 1912.
1,074,898.
Patented Oct. 7, 1913.
2 SHEETS—SHEET 2.
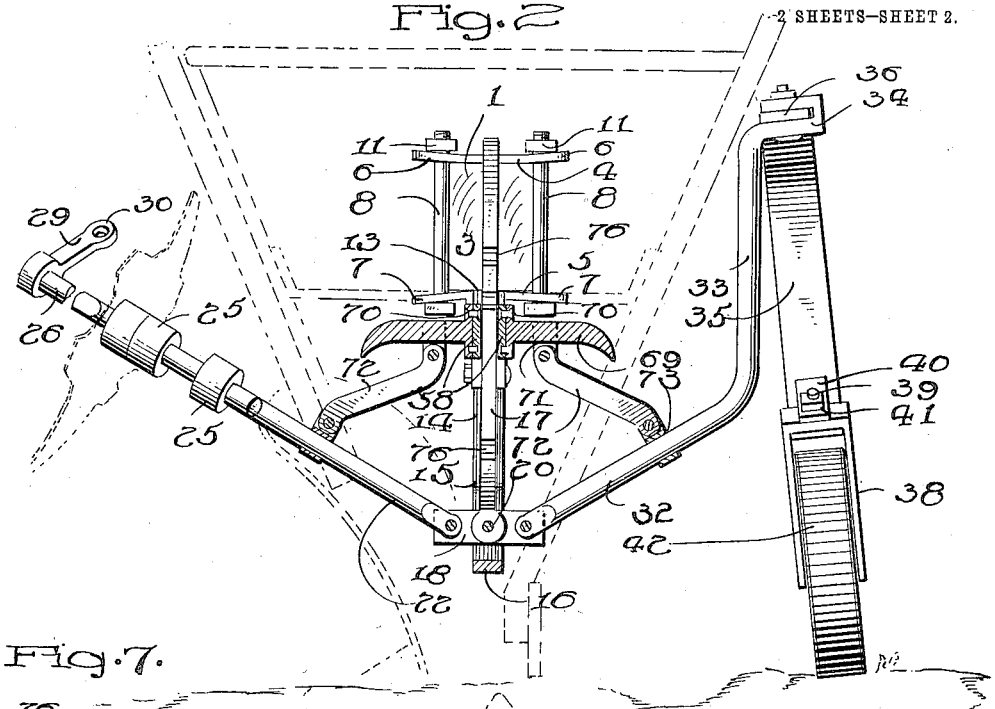
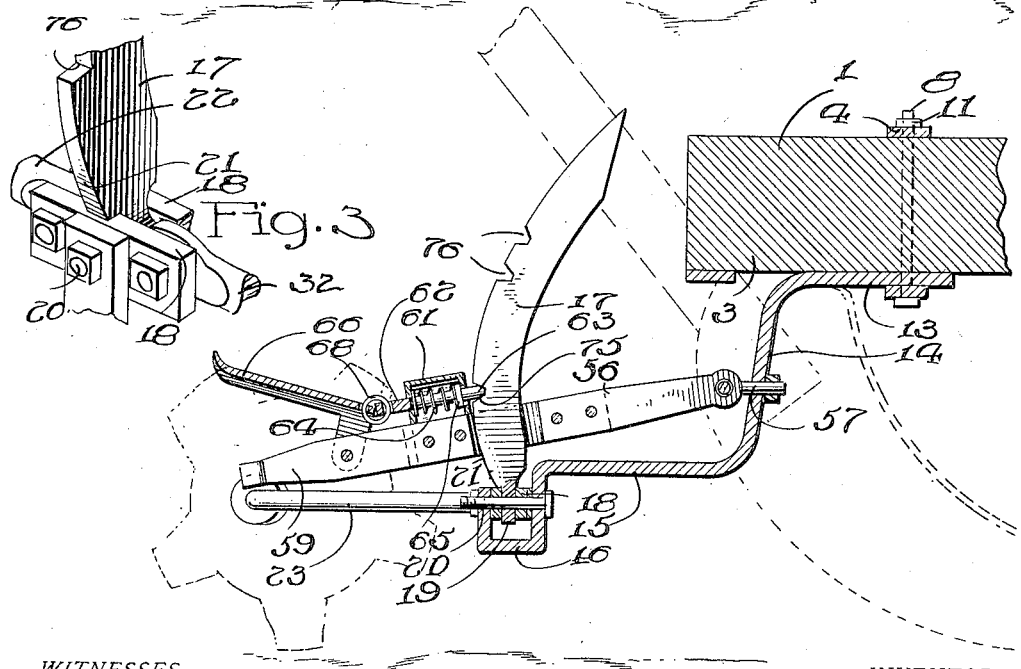
WITNESSES
INVENTOR
Karl Schulte
By E. E. Vrooman, his Attorney.

UNITED STATES PATENT OFFICE.

KARL SCHULTE, OF WOODWARDVILLE, MARYLAND.

PLOW ATTACHMENT.

1,074,898.  Specification of Letters Patent.  Patented Oct. 7, 1913.

Application filed April 25, 1912. Serial No. 693,057.

*To all whom it may concern:*

Be it known that I, KARL SCHULTE, a citizen of the United States, residing at Woodwardville, in the county of Anne Arundel and State of Maryland, have invented certain new and useful Improvements in Plow Attachments, of which the following is a specification, reference being had therein to the accompanying drawing.

This invention relates to harrow attachments for plows, and has for its object the production of an efficient harrow attachment which may be attached to the ordinary plow beam.

Another object of this invention is the production of an efficient harrow attachment which may be conveniently attached to a plow beam, and which may be readily thrown up out of engagement with the ground, if the harrow should come into engagement with a rock, stump, or other obstruction.

In the drawings: Figure 1 is a perspective view of the harrow attachment secured to the rear of the plow beam. Fig. 2 is a rear view of the harrow attachment the plow being shown in dotted lines. Fig. 3 is a central longitudinal section through the harrow attachment, and a portion of the plow beam, the plow blade, and harrow disk being shown in dotted lines. Fig. 4 is a longitudinal sectional view of the rear end of the plow beam showing the manner of attaching the spring arm to the beam. Fig. 5 is a transverse section through the plow beam and clamp for securing the harrow attachment to the beam. Fig. 6 is a detail perspective of the modified form of the invention showing the manner of attaching the plow attachment to a metallic beam. Fig. 7 is a detailed perspective of the manner of connecting the lower end of the quadrant to the harrow connecting tongue.

By considering Fig. 1, it will be seen that the present harrow attachment may be secured to the ordinary plow beam, and by swinging the harrow attachment upon the quadrant supported to the rear of the beam, the harrow disk may be thrown up out of engagement with any obstruction. By referring to Fig. 1, it will be seen that 1 designates the plow beam which carries the usual plow 2 and the rear end of the plow beam 3 projects rearwardly of the plow blade and is engaged by the harrow attaching clamp as illustrated in Figs. 1 and 3.

The harrow attaching clamp comprises an upper plate 4, and a lower plate 5. These plates have divergently bent ends 6 and 7, the ends of the upper plate 4 extending upwardly and the ends of the lower plate 5 extending downwardly. Bolts 8 pass through the elongated slots 9 formed in the plates 4 and 5, said bolts being provided with enlarged heads 10 at their lower ends, and having nuts 11 threaded at their upper ends for firmly clamping the bolts 8 in connection with the plates 4 and 5. By having the ends of the plates 4 and 5 diverging as illustrated clearly in Fig. 2, it will be seen that the bolts 8 may be adjusted laterally to the desired width to accommodate different width plow beams and, furthermore, by having the ends of the plates 4 and 5 extending divergently a firm clamp will be produced which will act as a nut lock for preventing the nuts 11 from becoming accidentally detached from the bolts 8. The lower plate 5 is provided with a socket portion 12 which socket portion receives the harrow connecting tongue 13. The harrow connecting tongue 13 extends longitudinally of the rear end 3 of the beam 1 and is bent downwardly to form a depending portion 14 intermediate its end. The tongue 13 is also bent near its free end rearwardly as indicated at 15 so as to extend in a line parallel to the inner end of the tongue 13 which end is secured to the plow beam 1. The portion 15 of the harrow supporting tongue is bent to form a substantially U-shaped pocket 16, which pocket forms an efficient support for the quadrant 17 and supporting links 18, hereinafter described. The supporting links 18 comprise elongated rectangular bodies placed upon each side of the flattened lower end 19 of the quadrant 17. A bolt 20 is passed through the lower U-shaped pocket 15, through the plates 18, and lower apertured end 19 of the quadrant 17 thereby firmly holding the quadrant and links in engagement with the tongue 13. The quadrant 17 is thickened near its lower end as indicated at 21 so as to overhang the upper edges of the links 18, and thereby prevent the independent lateral swing of the quadrant 17.

A harrow operating arm 22 is pivotally secured between the outer ends of the plates 18 to one side of the pivot bolt 20 as illustrated in Fig. 2, and this harrow operating arm 22 is provided with a rearwardly extending portion 23, said rearwardly extending portion 23 having a fork-shaped end 24 comprising a pair of box portions 25. These box portions 25 may be formed of any desired construction to lubricate the harrow supporting shaft 26. The harrow disk supporting shaft 20 carries a plurality of disk spacing members 27 of the ordinary type and between these spacing members are secured the harrow disks 28. The outer end of the harrow disk-supporting member 26 carries a forwardly extending link member 29, which link member carries an eye 30, which eye is engaged by means of a brace rod 31. This brace rod 31 may be secured to the beam at any desired point in the usual manner to brace the outer end of the harrow disk-supporting member or rod 26.

A tension operating arm 32 is pivotally secured between the plates 18 to one side of the quadrant 17, and this arm 32 is provided with an upwardly extending angle portion 33, said upwardly extending angle portion 33 being provided with a laterally bent U-shaped pocket portion 34. A spring 35 of a substantially U-shaped structure has its upper end 36 positioned within the substantially U-shaped upper end 34 of the upwardly extending portion 33 of the arm 32. The lower end of the spring 35 is provided with an angularly extending portion 37 which portion is securely bolted to a wheel supporting fork 38, by means of a bolt 39. A locking plate 40 is carried by the bolt 39 and engages the under face of the nut 41, and constitutes a nut lock for preventing the loosening of the nut 41, from the bolt 39. A supporting or steadying wheel 42 is carried by the fork 38.

A spring supporting plate 43 is secured to the side of the plow beam 1 and is securely held in engagement therewith by means of one of the bolts 8 of the harrow attaching clamp. The spring supporting plate 43 is provided with a sharpened inturned end 44 which fits into the side of the plow beam 1 and being spaced somewhat to the rear of the bolt 8, a very efficient securing means has thereby been produced. The front end of the plate 43 is provided with an angularly extending foot 45 through which is passed the arm 46 of the tension spring 47. The rear end of the arm 46 is held in engagement with the plate 43 by means of an eye 48, and the inner end of the arm 45 is bent laterally so as to form a finger 49 which finger limits the longitudinal movement of the arm 46 in a forward direction upon the plate 43. The end 49 which extends downwardly when in its normal position will prevent the spring 47 from sagging downwardly since this end will support the spring 47 in a position which is substantially right angular to the plow beam 1. The tension spring 47 is provided with a coil 50 which coil terminates in a laterally extending arm 51, said arm carrying at its outer end a hook 52, which hook engages a chain 53, said chain being connected at its opposite end to an eye bolt 54. This eye bolt is secured to the spring 35 within the arch portion 55 thereof.

A swinging link 56 is secured to an eye bolt 57 carried by the downwardly extending portion 14 of the tongue 13, and this link 56 carries at its opposite end a pair of spaced plates 58. These plates 58 carry at their opposite ends an operating foot lever 59 which lever carries a pair of laterally extending foot-engaging members 60. The ends of the link supporting member 56 and the foot lever 59 are spaced from each other so as to allow room for the quadrant 17. The quadrant 17 passes between the ends of the lever 59 and link 56 and said quadrant is formed on a sufficient arc to allow the lever to be swung over the quadrant 17 as illustrated clearly in Fig. 3.

A plunger supporting box 61 straddles the rear end of the plates 58 as illustrated in Figs. 1 and 2, and within this box 61 is carried a locking bolt 62, said locking bolt provided with a reduced end 63. A coil spring 64 is wound upon the bolt 62 and this coil spring normally bears against an enlarged head portion 65 for exerting an outward pressure upon the bolt 62. A plunger operating treadle 66 is provided with a pair of downwardly extending ears 67, which ears straddle the lever 59, and this treadle 66 is connected to the rear end of the bolt 62 by means of a ring 68.

A laterally extending arm 69 is secured to each of the plates 58, said arms 69 being provided with upwardly and downwardly extending feet 70 for holding the arms in firm engagement with the plates 58. The arms 69 are provided intermediate their ends with depending spaced ears 71 between which ears are pivotally mounted the inner end of the link members 72. The outer ends of the link members 72 are connected to collars 73, which collars engage respectively the harrow operating rod 22, and the tension operating arm 32. The outer ends of the arms 69 are flared or widened as illustrated at 74 to allow a slight lateral swing of said arms 69 upon the links 72, without fear of the ends 74 disengaging the upper edges of the links 72.

From the foregoing description, it will be seen that when the harrow is being operated, or is drawn down in engagement with the ground, the bolt 62 will engage the lower notch 75 and will, thereby, be held in a firm position, so as to effectively operate upon the soil which has been thrown up in the furrow.

Owing to the fact that the quadrant 17 is spaced from the rear end of the plow beam it will be seen that the plow may be swung from side to side so as to keep the same in a direct line without fear of interfering with the harrow disks and supporting wheel 42. It will be further obvious that the harrow and supporting wheel are so arranged as to not be in the way of the driver of the plow and owing to this position the driver of the plow may walk easily in the rear of the plow beam, and yet be in such a position as to throw the harrow out of engagement with any obstruction, at a moment's notice.

As illustrated in Fig. 1, it will be seen that the wheel 42 travels upon the land side of the plow and that the harrow disks travel in the furrow and although a left hand plow has been illustrated in the present drawing, it should be understood that the present device may be so interchanged as to accommodate itself to a right-hand plow.

When it is desired to lift the harrow out of engagement with the furrow so that the plow may pass an obstruction, the treadle 66 is depressed upon the lever 59 so as to draw the plunger 62 out of engagement with the lower notch 75. By raising the outer end of the lever 59 into engagement with one of the upper notches 76, the harrow disk may be thrown up at a radical angle so as to be out of engagement with any obstruction. The position taken by the harrow disk is clearly shown in the rear view in Fig. 2. The tension spring 35 likewise lifts the wheel out of engagement with the ground to be out of the way when the harrow is not in use.

If the wheel 42 should meet an obstruction, it will be seen that the spring 35 will allow the wheel to yield upwardly without any undue strain coming upon the arm 33 or the supporting portions for said arm. This spring 47 will constitute a steadying means for the spring 35 and prevent the spring 35 from twisting upon its connecting point where the same engages the substantially U-shaped upper end 34 of the arm 32. By means of this spring 47 the spring 35 will be held in its correct position parallel to the plow beam. It, of course, should be understood that the distance of the spring 47 relative to the spring 35 may be regulated by means of causing the hooked end 52 of the spring 47 to engage different links in the chain 53. It will be seen, by carefully considering Fig. 2 that since the outer ends of the arms 69 overhang the links 72, the said overhanging ends will facilitate the forcing of the harrow disk to an operative position owing to the fact that these outer ends will press against the upper ends of the links 72.

As illustrated in Fig. 6, which disclosed the modified form of the device for attaching the attachment to the plow beam, the tongue 13' may be twisted to form an upwardly extending end 14' which end is adapted to fit snugly against the beam 15'. This twisted upwardly extending end 14' is clamped firmly to the beam 15' by means of a clamping plate 16'. This clamping plate 16' is held in engagement with the twisted end 14' by means of transversely extending bolts 17'. One of the bolts 17' passes over the top of the beam 15', and the other bolt 17' passes under the beam 15' as indicated in Fig. 6. The spring supporting plate 43' is clamped between the beam 15' and the twisted end 14' similar to the manner in which the plate 43 is held in engagement with the beam 1 by means of the bolt 8 as illustrated in Fig. 1. The spring 47 will constitute a means for bracing the forward end of the spring 35 and will hold this spring against twisting movement upon the member 33. It will also be seen that this spring 47 will allow the device to be operated by swinging the lever 59 owing to the fact that the spring 47 may yield backward and forward to accommodate the different adjusted positions to which the harrow disks 27 are thrown.

Of course it should be understood that the attachment as above described and illustrated in the drawings may be attached to a plow beam wherein a single plow is used, or may be attached to the frame of a gang plow and still perform the function as set forth in the above specification.

What is claimed is:—

1. In a plow, the combination with a support, of a harrow attachment comprising a rearwardly extending tongue, means for clamping said tongue to said support, a harrow operating arm supported by said tongue, harrow disks carried by said harrow operating arm, a tension operating arm secured to said rearwardly extending tongue, a lever connected to said harrow operating arm and said tension operating arm for throwing said arms to an inoperative position, a supporting wheel, a spring interposed between said supporting wheel and said tension operating arm, and tension means carried by said support and engaging said spring for holding said spring and wheel parallel with said support.

2. A harrow attachment for a plow comprising a connecting tongue, a clamp for securing the same to a support of a plow, said tongue provided with a downwardly extending portion terminating into a rearwardly extending neck, a substantially U-shaped socket carried by the rear end of said neck, arm supporting links carried within said socket, a quadrant interposed between said links and extending upwardly, a harrow supporting crank arm connected between said links upon one side of said quadrant, a tension supporting crank arm secured between said links upon the opposite side of said quadrant, an operating link pivotally secured to said tongue, latch means associated therewith for engaging said quadrant and holding said link and crank arms in an inoperative position, laterally extending arms associated with said last-mentioned link, and connecting links engaging said laterally extending arms and crank arms for raising the same to an inoperative position when said latch means is swung upon said quadrant.

3. A harrow attachment of the class described comprising a tongue, a clamp for connecting said tongue to a plow beam, said tongue terminating in a U-shaped supporting pocket, a quadrant supported by said pocket, a link connected to said tongue, an operating lever associated with said link, a latch carried by said lever, coöperating with said quadrant for holding said link in a set position, crank arms connected to said substantially U-shaped pocket, laterally extending arms connected to said link, depending ears carried by each of said laterally extending arms, connecting members carried by said crank arms, and connecting links engaging said ears of said laterally extending arms, and said connecting members for throwing said crank arms to an inoperative position when said lever is thrown upwardly upon said quadrant, and a harrow disk associated with one of said crank arms.

4. A harrow attachment for a plow comprising a rearwardly extending tongue, means connecting said tongue to a plow beam, a quadrant carried by said tongue, a lever carried by said tongue and working upon said quadrant, laterally extending crank arms carried by said tongue and pivotally secured thereto and capable of having a vertical swinging movement, harrow disks associated with one of said crank arms, tension spring means carried by the other crank arm for facilitating the raising of said harrow disks to an inoperative position, means for engaging said other crank arm and supporting the same above the ground, laterally extending arms carried by said lever, links connecting said laterally extending arms with said crank arms and causing said crank arms to be raised vertically when said lever is raised, and said laterally extending arms provided with overhanging ends for engaging said links whereby said links will be forced downwardly when said lever is lowered and said crank arms will be thrown to their operative position.

5. A harrow attachment of the class described comprising a rearwardly extending tongue, a lever pivotally secured thereto, crank arms carried by said tongue and capable of having vertical movement, harrow disks secured to one of said crank arms, said crank arm which supports said harrow disks extending rearwardly, the other crank arm constituting a spring tension supporting arm and provided with an upwardly extending portion, said upwardly extending portion engaging a substantially V-shaped spring, an idler wheel engaging said spring, and said spring normally exerting an upward pressure upon said upwardly extending end of said last-mentioned crank arm.

6. In a plow the combination with a beam, a harrow attachment connected thereto, a clamping member for said harrow attachment comprising an upper and lower plate, bolts connecting said plates, a tension spring supporting plate placed between one of said bolts and said beam, said plate provided with a sharpened inturned rear end, said rear end engaging said beam at a distance from said bolt, the forward end of said plate provided with a laterally extending foot, an eye carried by said plate, a tension spring passing through said foot and eye and provided with a downwardly extending end, said spring extending laterally of said beam and provided with an outer hook, tension means associated with said harrow attachment for assisting in raising said harrow from the ground, and means for connecting said first-mentioned spring with said tension means for holding said tension means parallel with said beam.

7. A harrow attachment for a plow comprising a connecting tongue, means for securing the same to a beam of a plow, a quadrant carried by said connecting tongue, a harrow supporting crank arm connected to one side of said quadrant, a roller supporting crank arm secured to the opposite side of said quadrant, an operating link pivotally connected to said tongue, means carried thereby for engaging said quadrant and holding said link and crank arms in an inoperative position, laterally extending arms on said link, and means connecting said laterally extending arms and said crank arms for raising the same to an inoperative position.

In testimony whereof I hereunto affix my signature in presence of two witnesses.

KARL SCHULTE.

Witnesses:
 MAST STEEGMAYER,
 JOHN M. WOLF.

---

Copies of this patent may be obtained for five cents each, by addressing the "Commissioner of Patents, Washington, D. C."